(12) United States Patent
Malkova et al.

(10) Patent No.: US 11,060,982 B2
(45) Date of Patent: Jul. 13, 2021

(54) MULTI-DIMENSIONAL MODEL OF OPTICAL DISPERSION

(71) Applicant: KLA Corporation, Milpitas, CA (US)

(72) Inventors: Natalia Malkova, Hayward, CA (US); Mikhail Sushchik, Pleasanton, CA (US); Dawei Hu, Pleasanton, CA (US); Carlos L. Ygartua, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/815,362

(22) Filed: Mar. 11, 2020

(65) Prior Publication Data

US 2020/0292467 A1 Sep. 17, 2020

Related U.S. Application Data

(60) Provisional application No. 62/819,658, filed on Mar. 17, 2019.

(51) Int. Cl.
*G01N 21/95* (2006.01)
*G01B 11/06* (2006.01)
(Continued)

(52) U.S. Cl.
CPC ..... *G01N 21/9501* (2013.01); *G01B 11/0641* (2013.01); *G01N 21/956* (2013.01);
(Continued)

(58) Field of Classification Search
CPC ........... G01N 21/8851; G01N 21/9501; G01N 21/956; G01B 11/0641
(Continued)

(56) References Cited

U.S. PATENT DOCUMENTS 5,608,526 A 3/1997 Piwonka-Corle et al.
5,859,424 A 1/1999 Norton et al.
(Continued)

FOREIGN PATENT DOCUMENTS

JP 2010-133942 A 6/2010
WO 2016-187579 A1 11/2016

OTHER PUBLICATIONS

A.S. Ferlauto et al., Analytical model for the optical functions of amorphous semiconductors from the near-infrared to ultraviolet: Application in thin film photovoltaics, Journal of Applied Physics, vol. 92, No. 5, Sep. 1, 2002, pp. 2424-2436.
(Continued)

*Primary Examiner* — Hung Nguyen
(74) *Attorney, Agent, or Firm* — Spano Law Group; Joseph S. Spano

(57) ABSTRACT

Methods and systems for estimating values of parameters of interest from optical measurements of a sample early in a production flow based on a multidimensional optical dispersion (MDOD) model are presented herein. An MDOD model describes optical dispersion of materials comprising a structure under measurement in terms of parameters external to a base optical dispersion model. In some examples, a power law model describes the physical relationship between the external parameters and a parameter of the base optical dispersion model. In some embodiments, one or more external parameters are treated as unknown values that are resolved based on spectral measurement data. In some embodiments, one or more external parameters are treated as known values, and values of base optical dispersion model parameters, one or more external parameters having unknown values, or both, are resolved based on spectral measurement data and the known values of the one or more external parameters.

20 Claims, 5 Drawing Sheets

(51) Int. Cl.
*G01N 21/956* (2006.01)
*G06T 7/00* (2017.01)

(52) U.S. Cl.
CPC ........ *G06T 7/0004* (2013.01); *G01B 2210/56* (2013.01); *G06T 2207/30148* (2013.01)

(58) Field of Classification Search
USPC ................................ 355/52, 55; 356/237.2
See application file for complete search history.

(56) References Cited

U.S. PATENT DOCUMENTS

| | | | |
|---|---|---|---|
| 6,429,943 B1 | 8/2002 | Opsal et al. | |
| 6,633,831 B2 | 10/2003 | Nikoonahad et al. | |
| 6,734,967 B1 | 5/2004 | Piwonka-Corle et al. | |
| 6,816,570 B2 | 10/2004 | Janik et al. | |
| 6,895,075 B2 | 5/2005 | Yokhin et al. | |
| 6,972,852 B2 | 12/2005 | Opsal et al. | |
| 7,478,019 B2 | 1/2009 | Zangooie et al. | |
| 7,755,764 B2 | 7/2010 | Kwak et al. | |
| 7,826,071 B2 | 11/2010 | Shchegrov et al. | |
| 7,907,264 B1 | 3/2011 | Krishnan | |
| 7,929,667 B1 | 4/2011 | Zhuang et al. | |
| 7,933,026 B2 | 4/2011 | Opsal et al. | |
| 8,749,179 B2 | 6/2014 | Liu et al. | |
| 8,860,937 B1 | 10/2014 | Dziura et al. | |
| 8,879,073 B2 | 11/2014 | Madsen et al. | |
| 8,941,336 B1 | 1/2015 | Liu et al. | |
| 9,405,290 B1 | 8/2016 | Malkova et al. | |
| 9,595,481 B1 | 3/2017 | Malkova et al. | |
| 9,664,734 B2 | 5/2017 | Malkova et al. | |
| 9,915,522 B1 | 3/2018 | Jiang et al. | |
| 10,345,721 B1* | 7/2019 | Cao | G03F 9/70 |
| 2013/0083320 A1* | 4/2013 | Gao | G01N 21/8851 356/237.5 |
| 2013/0114085 A1 | 5/2013 | Wang et al. | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2014/0316730 A1 | 10/2014 | Shohegrov et al. | |
| 2015/0042984 A1 | 2/2015 | Pandev et al. | |
| 2015/0046118 A1 | 2/2015 | Pandev et al. | |
| 2015/0058813 A1 | 2/2015 | Kim et al. | |
| 2015/0110249 A1 | 4/2015 | Bakeman et al. | |
| 2015/0199463 A1 | 7/2015 | Iloreta et al. | |
| 2016/0109375 A1 | 4/2016 | Pandev et al. | |
| 2016/0139032 A1 | 5/2016 | Rampoldi et al. | |
| 2016/0141193 A1 | 5/2016 | Pandev et al. | |
| 2016/0282105 A1 | 9/2016 | Pandev | |
| 2018/0059019 A1 | 3/2018 | Houssam et al. | |
| 2019/0017946 A1 | 1/2019 | Wack et al. | |
| 2020/0200525 A1* | 6/2020 | Chouaib | G01B 11/0641 |

OTHER PUBLICATIONS

International Search Report dated Jul. 6, 2020, for PCT Application No. PCT/US2020/022870, filed on Mar. 15, 2020 by KLA Corporation, 3 pages.

* cited by examiner

MULTI-DIMENSIONAL MODEL OF OPTICAL DISPERSION

CROSS REFERENCE TO RELATED APPLICATION

The present application for patent claims priority under 35 U.S.C. § 119 from U.S. provisional patent application Ser. No. 62/819,658, entitled "Multidimensional Dispersion Model," filed Mar. 17, 2019, the subject matter of which is incorporated herein by reference.

TECHNICAL FIELD

The described embodiments relate to systems for optical characterization of structures and materials employed in semiconductor manufacturing.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection and metrology processes are used at various steps during a semiconductor manufacturing process to detect defects on wafers and measure parameters of interest to promote higher yield. As design rules and process windows continue to shrink in size, inspection and metrology systems are required to capture a wider range of physical defects on wafer surfaces and measure increasingly complex structural features while maintaining high throughput.

Semiconductor devices are increasingly valued based on both their energy efficiency and speed. For example, energy efficient consumer products are more valuable because they operate at lower temperatures and for longer periods of time on a fixed battery power supply. In another example, energy efficient data servers are in demand to reduce their operating costs. As a result, there is a strong interest to both increase speed and reduce energy consumption of semiconductor devices.

Leakage current through insulator layers is a major energy loss mechanism of semiconductor devices manufactured at the 65 nm technology node and below. In response, electronic designers and manufacturers are adopting new materials (e.g., hafnium silicate (HfSiO4), nitrided hafnium silicates (HfSiON), hafnium dioxide (HfO2), zirconium silicate (ZrSiO4), etc.) with higher dielectric constants than traditional materials (e.g., silicon dioxide). These "high-k" materials reduce leakage current and enable the manufacture of smaller sized transistors.

In addition, to the adoption of new materials, semiconductor structures are changing to meet the speed and energy efficiency goals. Increasingly complex FINFET structures and gate all around structures are under development for current and future fabrication nodes. Many of these advanced semiconductor structures employ material alloys to improve electron flow and hole mobility through channel structures (e.g., silicon-germanium alloys).

Along with the adoption of new dielectric materials and alloy materials, the need has arisen for measurement tools to characterize the dielectric properties and band structures of these materials early in the manufacturing process. More specifically, high throughput monitoring tools are required to monitor and control the deposition of high-k materials during wafer manufacture to ensure a high yield of finished wafers. Similarly, high throughput monitoring tools are required to monitor and control the concentration of alloy materials, their shape, process temperature, etc., during wafer manufacture to ensure a high yield of finished wafers.

Early detection of deposition problems is important because the deposition of high-k and alloy materials is an early process step of a lengthy and expensive manufacturing process. In some examples, a high-k material or alloy material is deposited on a wafer at the beginning of a manufacturing process that takes over one month to complete.

The performance of a logic gate is commonly characterized in terms of electrical characteristics such as equivalent oxide thickness (EOT), leakage current, threshold voltage, leakage EOT, and breakdown voltage. During device processing it is important to monitor and control these parameters. These electrical characteristics may be studied by a variety of methods including electrical measurements, transmission electron microscopy, x-ray spectroscopy and scattering, atomic force microscopy, and photoelectronic spectroscopy. Currently, however, these measurement technologies suffer from any of a number of limitations. In some cases, the measurements require destruction of the sample. In some cases, many post-deposition processing steps must be completed before measurements can occur. In some cases, the measurement technology is slow, and must be separated from the production line.

Optical metrology tools offer the possibility of high throughput, in-line, non-destructive characterization of electrical characteristics of device materials and structures. In particular, the spectroscopic ellisometry (SE) measurement technique includes a parametric representation of a measured optical dispersion.

In some examples, the parameterized model represents a dielectric function having a direct relation to the band gap of the device constituents as well as their defects; all major factors determining device electrical performance. In general, the particular parameterization is selected to reduce the number of unknown parameters and decrease correlations among parameters.

Although, optical metrology tools are successfully employed to characterize the electrical characteristics of device materials and structures, in many examples, it has proven difficult to translate the measured electrical properties into fabrication process control inputs to improve yield. Thus, it is desired to extend the utility of optical metrology tools to provide high throughput, in-line, non-destructive, direct measurement of material, structural, and process parameters, in addition to electrical characteristics of device materials and structures. In this manner, adjustments to fabrication control parameters may be made directly based on measurement results.

Existing parameterized models suffer from an inability to track parameters that can be directly controlled during the manufacturing process (e.g., film thickness, process temperature, material concentration, etc.). Tracking these control parameters of interest enables more effective process control, particularly during the manufacture of structures including alloys and high-k materials.

A multi-dimensional look-up model has been employed in an attempt to track control parameters of interest. However, the use of multiple reference dispersions increases measurement complexity and computational effort.

An approach based on custom parameters enables measurement of control parameters of interest, but the approach is based on custom parameters that are restricted by linear relations among the parameters. This limitation renders the approach unsuitable for many current and future use cases.

Accordingly, it would be advantageous to develop high throughput systems and methods for characterizing structures and materials early in the manufacturing process based on optical metrology. In particular, it would be advantageous to develop a robust, reliable, and stable approach to in-line SE metrology of semiconductor structures including alloy materials and high-K dielectrics.

SUMMARY

Methods and systems for estimating values of parameters of interest from optical measurements of a sample early in a production flow based on a multidimensional optical dispersion (MDOD) model are presented herein. The MDOD model enables robust, high throughput tracking of multiple parameters of interest, including fabrication control parameters, structural parameters, material composition parameters, electrical parameters, etc.

An MDOD model describes the optical dispersion of materials comprising a structure under measurement in terms of parameters external to a base optical dispersion model. In some embodiments, the MDOD model enables tracking of external parameters of interest by capturing the effects of these parameters on measured optical dispersions of semiconductor device materials, including semiconductors, metals and dielectrics. The MDOD model parameterization is physics based and is Kramers-Kronig consistent. This enables the model to measure parameters of interest over a broad range of dispersion model variations, resulting in robust and flexible tracking of multiple parameters of interest.

A MDOD model includes a base optical dispersion model. The base optical dispersion model is a material model that idealizes the material as a homogeneous continuum, without reference to specific geometry, process conditions, impurities, etc. Typically, a base optical dispersion model is parameterized in terms of model parameters, such as electrical parameters, e.g., band gap, band peak locations, etc.

In one aspect, the MDOD model includes a parameterization of one or more of the parameters of the base optical dispersion model (e.g., electrical parameters such as band gap, band peak locations, etc.) in terms of one or more parameters external to the base optical dispersion model. In this manner, one or more parameters of the base optical dispersion model are themselves parameterized in terms of additional parameters. Thus, one or more of the parameters of the base optical dispersion model become variable functions, i.e., functions of one or more external parameters of interest. In some examples, all parameters of the base optical dispersion model are expressed as functions of one or more external parameters.

In one example, each parameter of a base optical dispersion model is expressed as a function of one or more external parameters. Each function is not restricted by the selection of the base optical dispersion model. Each function is selected to best describe the relationship between the external parameters and the corresponding parameter of the base optical dispersion model. In general, the parameterization of each parameter of the base optical dispersion model can be based on any suitable mathematical function. In some examples, a power law model is employed to describe the physical relationship between the external parameters under measurement and the corresponding parameter of the base optical dispersion model.

In a further aspect, the MDOD model is trained based on Design of Experiments (DOE) data to resolve the values of constant model parameters. Once the values of the constant model parameters are resolved, the MDOD model is used to solve for values of external parameters, parameters of the base optical dispersion model, or both, based on spectral measurement data.

In some embodiments, one or more external parameters employed to parameterize one or more of the base optical dispersion model parameters are treated as unknown values that are resolved based on spectral measurement data. In some examples, the external parameters are fabrication control parameters, i.e., parameters that directly correlate with process control variables of the semiconductor fabrication process. In some examples, the external parameters are structural parameters characterizing a material or dimension of a structure of the semiconductor wafer.

In some embodiments, one or more external parameters employed to parameterize one or more of the base optical dispersion model parameters are treated as known values. In these embodiments, values of base optical dispersion model parameters, one or more external parameters having unknown values, or both, are resolved based on spectral measurement data and the known, fixed values of the one or more external parameters.

In some embodiments, characteristics of a layer of the semiconductor wafer different from the one or more layers of the semiconductor wafer characterized by the base optical dispersion model are resolved based on the MDOD model.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Figure 1:
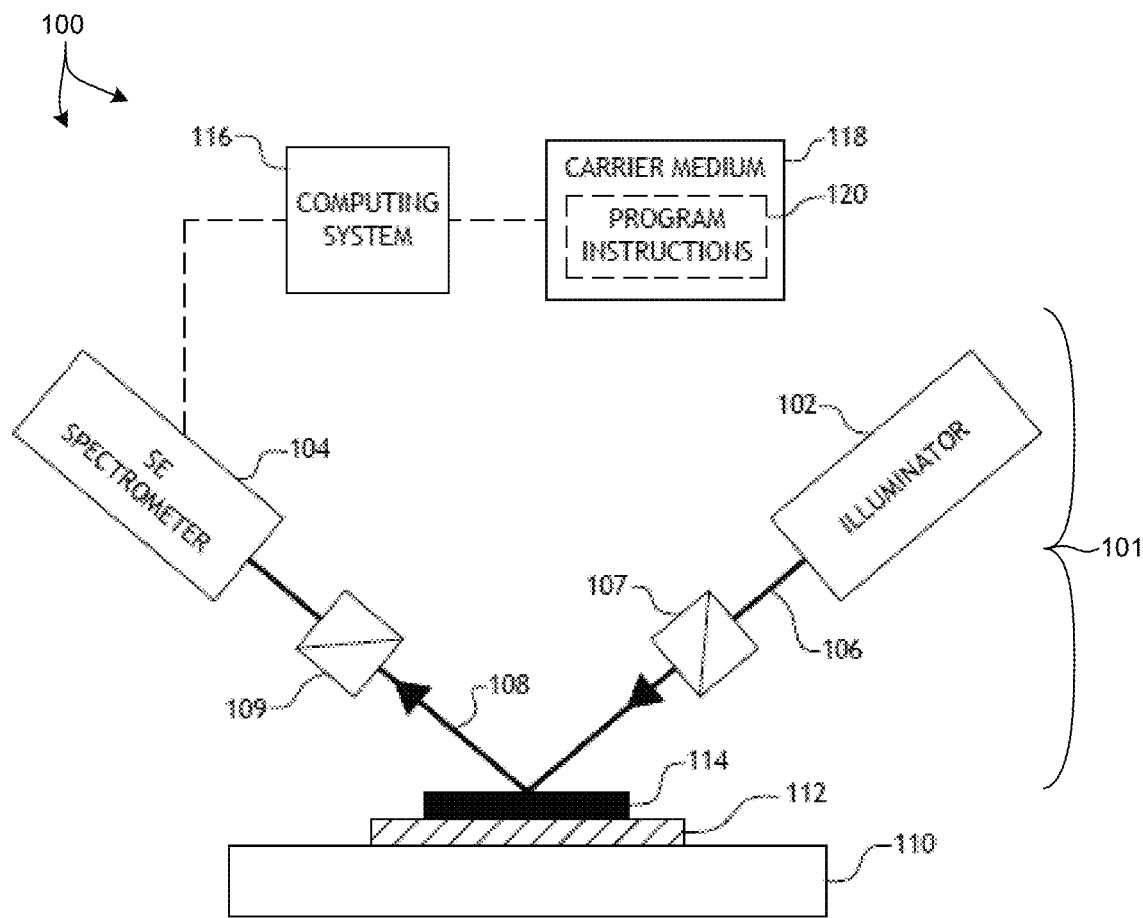
FIG. 1 is a simplified diagram illustrative of a wafer measurement system 100 including thin film characterization functionality.

Reference will now be made in detail to background examples and some embodiments of the invention, examples of which are illustrated in the accompanying drawings.

Methods and systems for estimating values of parameters of interest from optical measurements of a sample early in a production flow based on a multidimensional optical dispersion (MDOD) model are presented herein. The MDOD model enables robust, high throughput tracking of multiple parameters of interest, including fabrication control parameters, structural parameters, material composition parameters, electrical parameters, etc. In some measurement applications, measurement accuracy is improved and the computational effort required to develop the MDOD model is less than alternative techniques.

Current and future semiconductor structures include, but are not limited to, materials having optical dispersion properties that strongly depend on the particular device application of the materials and the processes employed to deposit and shape the materials. For example, the optical dispersion properties of some materials depend on process temperature, process induced deformation (e.g., stress or strain), material concentrations of alloy materials, impurity concentration, annealing temperature, device dimensions (particularly when the dimensions approach the quantum confinement regime), and other parameters. An effective MDOD model monitors as many parameters as required to effectively control the fabrication process.

The MDOD model describes the optical dispersion of materials comprising a structure under measurement in terms of parameters external to a base optical dispersion model. In some embodiments, the MDOD model enables tracking of external parameters of interest by capturing the effects of these parameters on measured optical dispersions of semiconductor device materials, including semiconductors, metals and dielectrics. The MDOD model parameterization is physics based and is Kramers-Kronig consistent, provided the underlying base optical dispersion model is Kramers-Kronig consistent. This enables the model to measure parameters of interest over a broad range of dispersion model variations, resulting in robust and flexible tracking of multiple parameters of interest.

The MDOD model is based on the generic representation of the dielectric function, $\varepsilon_2(\omega)$. In particular, in the case of electron inter-band transitions, $\varepsilon_2(\omega)$, can be expressed in terms of the joint-density-of states $J_{cv}$ as described in equation (1).

$$\varepsilon_2(\omega) = \frac{4\hbar^2 e^2}{\pi m^2 \omega^2} | <c|p|v> |^2 J_{cv}(\omega) \quad (1)$$

$<c|p|v>$ is the momentum matrix element for valence (v) to conduction (c) transitions, h is the reduced Planck constant, e is the electron charge, and m is the electron mass. Both the momentum matrix element and joint-density-of-states are strictly related to the electron and phonon band structure of the material as well as temperature. In turn, the band structure is defined by the energy levels of atoms and lattice symmetry, which are dependent on parameters such as size, symmetry, alloy/impurity concentration, any deformation like stress or strain as well as temperature, i.e., parameters external to a base optical dispersion model. This ensures that the dielectric function can be parameterized in terms of parameters external to the base optical dispersion model. In addition, by parameterizing the real and imaginary part of the dielectric function with the same parameters, the MDOD model is Kramers-Kronig consistent, provided the underlying base optical dispersion model is Kramers-Kronig consistent.

A MDOD model includes a base optical dispersion model. The base optical dispersion model is a material model that idealizes the material as a homogeneous continuum, without reference to specific geometry, process conditions, impurities, etc. Typically, a base optical dispersion model is parameterized in terms of model parameters, such as electrical parameters, e.g., band gap, band peak locations, etc. By way of non-limiting example, the complex refractive index, n, is expressed as a function of beam energy, $\omega$, and constant valued electrical parameters $E_1$, $E_2$, $E_3$, etc., as illustrated in Equation (2).

$$n = n(\omega, E_1, E_2, E_3, \text{etc.}) \quad (2)$$

In some of these examples, the complex refractive index, n, is expressed as a function of beam energy, $\omega$, and constant valued electrical parameters Eg, $E_{01}$, $C_{b1}$, $E_{02}$, $C_{b2}$, etc., as illustrated in Equation (3), $$n = n(\omega, E_g, E_{01}, C_{b1}, E_{02}, C_{b2}, \text{etc.}) \quad (3)$$

where, Eg, is the band gap, $E_{oi}$, is the optical transition peak energy of the ith modelled transition, and $C_{bi}$ is the optical transition width of the ith modelled transition.

The base optical dispersion model can be any desired parametric dispersion model. In some embodiments, the base optical dispersion model described with reference to Equation (2) is any base optical dispersion model implemented in the Film Thickness Measurement Library (FTML) of the Off-line Spectral Analysis (OLSA) stand-alone software designed to complement thin film measurement systems such as the Aleris 8510 available from KLA-Tencor Corporation, Milpitas, Calif. (USA).

In general, a base optical dispersion model as described herein may be configured to characterize any useful optical dispersion metric. For example, any of the real (n) and imaginary (k) components of the complex index of refraction may be characterized by the base optical dispersion model. In another example, any of the real ($\varepsilon_1$) and imaginary ($\varepsilon_2$) components of the complex dielectric constant may be characterized by the base optical dispersion model. In some examples, the base optical dispersion model may be anisotropic. In these examples, the real ($\varepsilon_1$) and imaginary ($\varepsilon_2$) components of the complex dielectric constant are tensors. In other examples, any of the square root of $\varepsilon_2$, absorption constant $\alpha = 4\pi k/\lambda$, conductivity ($\sigma$), skin depth ($\delta$), and attenuation constant $(\sigma/2)*\text{sqrt}(\mu/\varepsilon)$, where $\mu$ is the free space permeability, may be characterized by the base optical dispersion model. In other examples, any combination of the aforementioned optical dispersion metrics may be characterized by the base optical dispersion model. The aforementioned optical dispersion metrics are provided by way of non-limiting example. Other optical dispersion metrics or combinations of metrics may be contemplated.

In some other examples, a complex dispersion model, like a Bruggeman Effective Model Approximation (BEMA) model or a Sum model, is employed as a base optical dispersion model. The complex dispersion model represents the dielectric function of the layer as an effective composition of assumed dielectric functions of constituents. The optimized effective composition is then related to the composition of the dielectric layer of interest. In general, the complex model is based on Kramers-Kronig consistent dielectric functions of constituents, and thus is itself Kramers-Kronig consistent.

A complex dispersion model is used to extract dispersion curves (e.g., the real ($\varepsilon_1$) and the imaginary ($\varepsilon_2$) parts of the dielectric function, or refractive index (n) and extinction coefficient (k)) from SE measurements. Subsequently, the calculated dispersion curves are interpolated in the energy range of interest to evaluate the band gap. The accuracy of the band gap estimate depends strongly on the choice of the energy of interest for band gap interpolation. Moreover, since band gap must be indirectly derived from the calculated dispersion curves, a reference is required to provide accurate results.

In some other examples, a Tauc-Lorentz model or a Cody-Lorentz model is employed as a base optical dispersion model as described by way of example in A. S. Ferlauto et al., "Analytical model for the optical functions of amorphous semiconductors from the near-infrared to ultraviolet: Application in thin film photovoltaics," J. Appl. Phys. 92, 2424 (2002), the subject matter of which is incorporated herein by reference in its entirety. In these models, the imaginary part of the dielectric function is represented by a parameterized dispersion function, and the real part of the dielectric function is determined based on enforcement of Kramers-Kronig consistency. Model parameters are evaluated by fitting modeled spectra to measured spectra by numerical regression. The validity and limitations of the models are assessed by statistical evaluation of fitting quality and confidence limits of model parameters.

In another example, the optical response of one or more materials is characterized by a base optical dispersion model including a continuous Cody-Lorentz model having a first derivative function that is continuous at the Urbach transition energy of the model and at least one unbounded Gaussian oscillator function. In one example, the optical dispersion model includes one or more Gaussian oscillator functions to account for defect states, interface states, phonon modes, or any combination thereof. In this manner, the optical dispersion model is sensitive to one or more defects of the unfinished, multi-layer semiconductor wafer.

In another example, the selected base optical dispersion model is a critical point model.

In other examples, the selected base optical dispersion model includes one or more harmonic oscillator models of optical dispersion.

In some examples, the parameter values of a base optical dispersion model of the real ($\varepsilon_1$) and imaginary ($\varepsilon_2$) components of the complex dielectric constant across the selected spectral range are determined utilizing a regression process. In this regard, a regression method may be applied to the measured spectral data using a selected base optical dispersion model.

In at least one aspect, the MDOD model includes a parameterization of one or more of the parameters of the base optical dispersion model (e.g., electrical parameters such as band gap, band peak locations, etc.) in terms of one or more parameters external to the base optical dispersion model. In this manner, one or more parameters of the base optical dispersion model are themselves parameterized in terms of additional parameters. Thus, one or more of the parameters of the base optical dispersion model become variable functions, i.e., functions of one or more external parameters of interest. In some examples, all parameters of the base optical dispersion model are expressed as functions of one or more external parameters.

In one example, each parameter, $BP_i$, of a base optical dispersion model is expressed as a function of one or more external parameters, $EP_k$, where k=1:N. The number N defines the dimensionality of the model, where N is any positive integer number. Assuming that model dimensionality is two, i.e., N=2, each parameter, $BP_i$, of the base optical dispersion model is expressed as a function of two different external parameters as illustrated by equation (4).

$$BP_i = f_i(EP_1, EP_2) \qquad (4)$$

Each function, $f_i$, is not restricted by the selection of the base optical dispersion model. Each function, $f_i$, is selected to best describe the relationship between the external parameters and the corresponding parameter of the base optical dispersion model. In general, the parameterization of each parameter of the base optical dispersion model can be based on any suitable mathematical function. However, in preferred embodiments, each function, $f_i$, is selected to best describe the physical relationship between the external parameters under measurement and the corresponding parameter of the base optical dispersion model. In some examples, a power law model is employed to describe the physical relationship between the external parameters under measurement and the corresponding parameter of the base optical dispersion model.

In some embodiments, each function, $f_i$, is a linear combination of functions, $\varphi$, that depend on constant valued parameters and an external parameter. Equation (5) illustrates a general formulation of a function, $f_i$, $$f_i(EP_1, EP_2) = BP_i^0 + \sum_{j=1}^{M1} \varphi_{1j}^{EP_i}(A_{1j}^{EP_i}, B_{1j}^{EP_i}, EP_1) + \sum_{j=1}^{M2} \varphi_{2j}^{EP_i}(A_{2j}^{EP_i}, B_{2j}^{EP_i}, EP_2) \qquad (5)$$

where $BP_i^0$ is the nominal value of parameter, $BP_i$, function $\varphi_{1j}^{EP_i}$ is a predetermined function of $EP_1$, and constants $A_{1j}^{Ei}$ and $B_{1j}^{EP_i}$, and $\varphi_{2j}^{EP_i}$ is a predetermined function of $EP_2$, and constants $A_{2j}^{EP_i}$ and $B_{2j}^{EP_i}$. The number of terms, M1, of the summation of functions, $\varphi_{1j}^{EP_i}$, is any positive integer value, and the number of terms, M2, of the summation of functions, $\varphi_{2j}^{EP_i}$, is any positive integer value. In the example depicted in equation (5), the functions $\varphi_{1j}^{EP_i}$ and $\varphi_{2j}^{EP_i}$ depend on constants $A_{1j}^{EP_i}$ and $B_{1j}^{EP_i}$, and $A_{2j}^{EP_i}$ and $B_{2j}^{EP_i}$ respectively. However, in general, functions $\varphi_{1j}^{EP_i}$ and $\varphi_{2j}^{EP_i}$ may depend on any number of sets of constants. The functions $\varphi_{1j}^{EP_i}$ and $\varphi_{2j}^{EP_i}$ are defined by the physical dependence of $BP_i$ on each of the external parameters $EP_1$ and $EP_2$. For example, if $BP_i$ is band gap and $EP_1$ is film thickness, and it is known that bandgap approximately scales as a function of thickness to the power of –2, then $\varphi_{1j}^{Ei}$ is selected as a series of power functions of film thickness, with powers being set close to –2 depending on how well the parabolic approximation is valid for the material of interest.

In some examples, functions $\varphi_{1j}^{EP_i}$ and $\varphi_{2j}^{EP_i}$ are power law functions employed to describe the physical relationship between the external parameters under measurement and the corresponding parameter of the base optical dispersion model. For example, equation (6) illustrates a parameterization of $BP_i$ in terms of $EP_1$ and $EP_2$ in accordance with Equation (5), where M1 and M2 are both equal to two, and $\varphi_{1j}^{EPi}$ and $\varphi_{2j}^{EPi}$ are both power law functions expressed in terms of constants A and B.

$$BP_i = BP_i^0 + A_{11}EP_1^{B_{11}} + A_{12}EP_1^{B_{11}} + A_{21}EP_2^{B_{21}} + A_{22}EP_2^{B_{22}} \qquad (6)$$

In a further aspect, the MDOD model is trained based on Design of Experiments (DOE) data to resolve the values of constant model parameters. For example, as depicted in Equations (5) constants $A_{1j}^{EPi}$ and $B_{1j}^{EPi}$ are resolved recursively based on known values of $BP_i$, $EP_1$ and $EP_2$. Once the values of constants $A_{1j}^{EPi}$ and $B_{1j}^{EPi}$ are resolved, the MDOD model is used to solve for values of $EP_1$ and $EP_2$ based on spectral measurement data.

In some embodiments, one or more external parameters employed to parameterize one or more of the base optical dispersion model parameters are treated as unknown values that are resolved based on spectral measurement data. In some examples, the external parameters are fabrication control parameters, i.e., parameters that directly correlate with process control variables of the semiconductor fabrication process. By way of non-limiting example, a fabrication control parameter includes any of a process temperature, a process pressure, a process material flow, a process time interval, etc. In general, any controllable process control variable of a semiconductor manufacturing process may be contemplated as a fabrication control parameter within the scope of this patent document.

In some examples, the external parameters are structural parameters characterizing a material or dimension of a structure of the semiconductor wafer. By way of non-limiting example, a structural parameter includes any of a film thickness, a material concentration of an alloy material, a process induced deformation, an impurity concentration, and a device dimension, etc. In general, any dimensional or material characteristic of any structure of a semiconductor wafer may be contemplated as a structural parameter within the scope of this patent document.

In some embodiments, the values of the external parameters of interest are directly employed to control a fabrication process to achieve improved device yield (e.g., fabrication control parameters or structural parameters).

In some embodiments, one or more external parameters employed to parameterize one or more of the base optical dispersion model parameters are treated as known values. In these embodiments, values of base optical dispersion model parameters, one or more external parameters having unknown values, or both, are resolved based on spectral measurement data and the known, fixed values of the one or more external parameters.

In some embodiments, the fixed value of one or more external parameters is determined based on measurements that do not involve the spectral response of the semiconductor wafer at the measurement spot under consideration. In some examples, the known value of one or more external parameters (e.g., film thickness) is determined from a another measurement of the semiconductor structure (e.g., spectral measurement at a previous step of the fabrication process, sheet resistance measurements, measurements of the same structure on other wafers, measurements that are correlated with properties of the measured layer, end of line electrical measurements of semiconductor structures fabricated under the same process conditions, measurements of the same structure at different locations on the wafer, etc.). In general, the values of one or more external parameters may be determined from any information source correlated with the structure under measurement.

In some embodiments, the external parameters of a MDOD model are abstract parameters, i.e., parameters that do not directly correspond to any physical or process parameter. Typically, the abstract parameters are selected to capture multiple effects, thereby reducing correlation among the set of external parameters and parameters of the base optical dispersion model. The abstract parameters may be analyzed statistically, e.g., using principle component analysis, separate from the regression analysis employed to resolve the MDOD model. In some of these embodiments, an MDOD model including one or more abstract parameters improves measurement results for one or more layers modelled by the MDOD model. In some of these embodiments, an MDOD model including one or more abstract parameters improves measurement results for other layers of a multiple layer structure under measurement that are not modelled by the MDOD model.

In some embodiments, values of one or more parameters characterizing a different layer of the semiconductor wafer are determined based at least in part on values of the one or more parameters of the base optical dispersion model. In these embodiments, characteristics of a layer of the semiconductor wafer different from the one or more layers of the semiconductor wafer characterized by the base optical dispersion model are resolved based on the MDOD model. In some examples, the one or more external parameters include a parameter describing another layer of a multiple layer stack model (e.g., thickness of another layer).

In one example, the Silicon-Germanium layer 114A is modelled using a MDOD model. An external parameter of the MDOD model is the percentage of Germanium of layer 114A, and the refractive index is a base optical dispersion model parameter. Using the MDOD model, a more accurate estimate of the refractive index of layer 114A is obtained by floating both the value of a specific parameter of the base optical dispersion model and the percentage of Germanium in a model-based regression analysis of the measured spectral response. The accurately estimated value of the refractive index enables the estimation of thickness of intermediate layer 114B. The optical response of intermediate layer 114B may be evaluated independently or in a coupled analysis with layer 114A. The optical response of intermediate layer 114B may be modelled using a MDOD model, or a simplified model such as a table model.

In some examples, the MDOD model describes one layer of a single layer structure (e.g., the substrate itself, a single layer disposed above the substrate, etc.).

In some examples, the MDOD model describes one layer of a multiple layer structure modelled where each layer of the multiple layer structure is modelled independently.

In some examples, the MDOD model describes multiple layers of a multiple layer structure modelled by a stack model.

FIG. 1 illustrates a system 100 for measuring a spectral response of a thin film of a semiconductor wafer, in accordance with one embodiment of the present invention. As shown in FIG. 1, the system 100 may be used to perform spectroscopic ellipsometry on one or more films 114 of a semiconductor wafer 112 disposed on a translation stage 110. In this aspect, the system 100 may include a spectroscopic ellipsometer equipped with an illuminator 102 and a spectrometer 104. The illuminator 102 of the system 100 is configured to generate and direct illumination of a selected wavelength range (e.g., 150-850 nm) to the thin film (e.g., SiGe thin film) disposed on the surface of the semiconductor wafer 112. In turn, the spectrometer 104 is configured to receive illumination reflected from the surface of the semiconductor wafer 112. It is further noted that the light emerging from the illuminator 102 is polarized using polarizer 107 to produce a polarized illumination beam 106. The radiation reflected by the thin film 114 disposed on the wafer 112 is passed through an analyzer 109 and to the spectrometer 104. In this regard, the radiation received by the spectrometer 104 in the collection beam 108 is compared to the incident radiation of the illumination beam 106, allowing for spectral analysis of the thin film 114.

In a further embodiment, the system 100 may include one or more computing systems 116. The one or more computing systems 116 may be communicatively coupled to the spectrometer 104. In one aspect, the one or more computing systems 116 may be configured to receive a set of spectral measurements performed by the spectrometer 104 on one or more wafers. Upon receiving results of the one or more sampling process from the spectrometer, the one or more computing systems 116 may then calculate parameters of a MDOD model. In this regard, the computing system 116 may extract values of one or more external parameters based on the acquired spectrum from the spectrometer 104. Further, the computing system 116 may extract the n- and k-curves utilizing a regression process (e.g., ordinary least squares regression) applied to a selected based optical dispersion model. In a preferred embodiment, the selected base optical dispersion model is a complex model like a BEMA or a Sum model, or an oscillator based model, like a Gaussian model, a Cody-Lorentz model, a Tauc-Lorentz model, a Harmonic Oscillator model, etc.

In a further embodiment, the computing system 116 may control a process of manufacture of a semiconductor wafer based at least in part on the values of one or more parameters of the MDOD model. For example, computing system 116 may be configured to communicate process control parameter values to one or more manufacturing tools responsible for the manufacture of the semiconductor wafers being measured.

Figure 2:
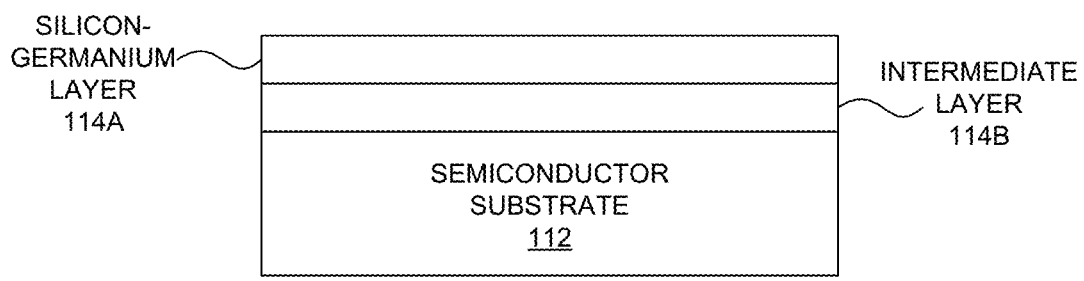
FIG. 2 is a simplified diagram illustrative of a semiconductor substrate 112 with attached thin film layers 114A and 114B that may be characterized by methods and systems as described herein.

As illustrated in FIG. 2, in some embodiments, an intermediate layer 114B is located between a semiconductor substrate 112 (e.g., silicon) and a Silicon Germanium (SiGe) layer 114A to promote adhesion. Typically, the intermediate layer 114B is very thin (e.g., ten Angstroms). In some examples, the SiGe layer 114A and the intermediate layer 114B are modeled together as one layer for purposes of analysis employing the methods and systems as described herein. In this example, the one or more computing systems 116 may determine one or more parameters of an MDOD model of the film layer 114 including both the intermediate layer 114B and SiGe layer 114A. However, in some other examples, each layer may be modeled separately. In this example, the one or more computing systems 116 may determine one or more parameters of an MDOD model of the SiGe insulative layer 114A and one or more parameters of an MDOD model of the intermediate layer 114B.

It should be recognized that the various steps described throughout the present disclosure may be carried out by a single computer system 116 or, alternatively, a multiple computer system 116. Moreover, different subsystems of the system 100, such as the spectroscopic ellipsometer 101, may include a computer system suitable for carrying out at least a portion of the steps described above. Therefore, the above description should not be interpreted as a limitation on the present invention but merely an illustration. Further, the one or more computing systems 116 may be configured to perform any other step(s) of any of the method embodiments described herein.

In another embodiment, the computer system 116 may be communicatively coupled to the spectrometer 104 or the illuminator subsystem 102 of the ellipsometer 101 in any manner known in the art. For example, the one or more computing systems 116 may be coupled to a computing system of the spectrometer 104 of the ellipsometer 101 and a computing system of the illuminator subsystem 102. In another example, the spectrometer 104 and the illuminator 102 may be controlled by a single computer system. In this manner, the computer system 116 of the system 100 may be coupled to a single ellipsometer computer system.

The computer system 116 of the system 100 may be configured to receive and/or acquire data or information from the subsystems of the system (e.g., spectrometer 104, illuminator 102, and the like) by a transmission medium that may include wireline and/or wireless portions. In this manner, the transmission medium may serve as a data link between the computer system 116 and other subsystems of the system 100. Further, the computing system 116 may be configured to receive spectral results via a storage medium (i.e., memory). For instance, the spectral results obtained using a spectrometer of an ellipsometer may be stored in a permanent or semi-permanent memory device. In this regard, the spectral results may be imported from an external system.

Moreover, the computer system 116 may send data to external systems via a transmission medium. Moreover, the computer system 116 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the computer system 116 and other subsystems of the system 100. Moreover, the computer system 116 may send data to external systems via a transmission medium.

The computing system 116 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 120 implementing methods such as those described herein may be transmitted over or stored on carrier medium 118. The carrier medium may be a transmission medium such as a wire, cable, or wireless transmission link. The carrier medium may also include a computer-readable medium such as a read-only memory, a random access memory, a magnetic or optical disk, or a magnetic tape.

The embodiments of the system 100 illustrated in FIG. 1 may be further configured as described herein. In addition, the system 100 may be configured to perform any other step(s) of any of the method embodiment(s) described herein.

Figure 3:
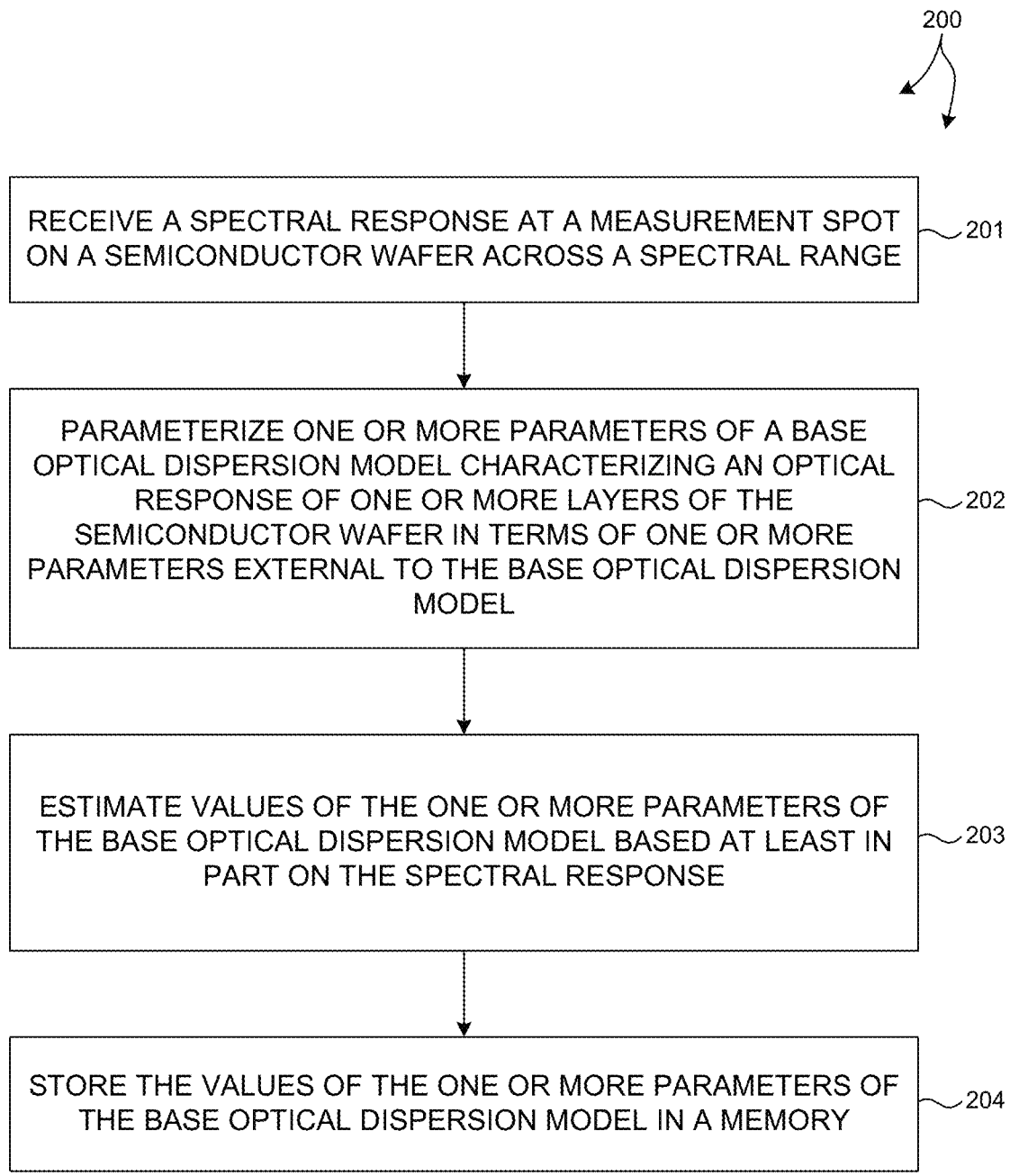
FIG. 3 is a flowchart illustrative of a method 200 of determining values of external parameters of a multidimensional optical dispersion (MDOD) model from spectral response data.

FIG. 3 illustrates a process flow 200 suitable for implementation by the system 100 of the present invention. In one aspect, it is recognized that data processing steps of the process flow 200 may be carried out via a pre-programmed algorithm executed by one or more processors of computing system 116. While the following description is presented in the context of system 100, it is recognized herein that the particular structural aspects of system 100 do not represent limitations and should be interpreted as illustrative only.

In block 201, a spectral response of a semiconductor wafer across a broad spectral range is received by a computing system. In one example, the measurement is performed after a SiGe thin film is deposited on the wafer. For example, spectra may be received from an ellipsometer 101. In another example, spectra may be received from a reflectometer (not shown). The spectral data may be acquired from each of the thin films 114 deposited on the wafer 112 utilizing the spectroscopic ellipsometer 101. For instance, the ellipsometer 101 may include an illuminator 102 and a spectrometer 104, as discussed previously herein. The spectrometer 104 may transmit results associated with a spectroscopic measurement of the thin films of the wafer to one or more computing systems 116 for analysis. In another example, the spectra for multiple thin films 114 may be acquired by importing previously obtained spectral data. In this regard, there is no requirement that the spectral acquisition and the subsequent analysis of the spectral data need be contemporaneous or performed in spatial proximity. For instance, spectral data may be stored in memory for analysis at a later time. This may be desirable, for example, for diagnostic purposes, or analysis of large sets of measurement data. In another instance, spectral results may be obtained and transmitted to an analysis computing system located at a remote location.

In block 202, one or more parameters of a base optical dispersion model characterizing an optical response of one or more layers of the semiconductor wafer are parameterized in terms of one or more parameters external to the base optical dispersion model.

In block 203, values of one or more parameters of the base optical dispersion model are estimated based at least in part on the spectral response as described herein.

In block 204, the estimated values of one or more parameters of the base optical dispersion model are stored in a memory (e.g., memory 118). The stored values may be used, for example, to perform further analysis of the specimen, or to control manufacturing process parameters.

A MDOD model has been demonstrated to work effectively for tracking multiple external parameters within a range and distribution of values across a wafer.

Figure 4:
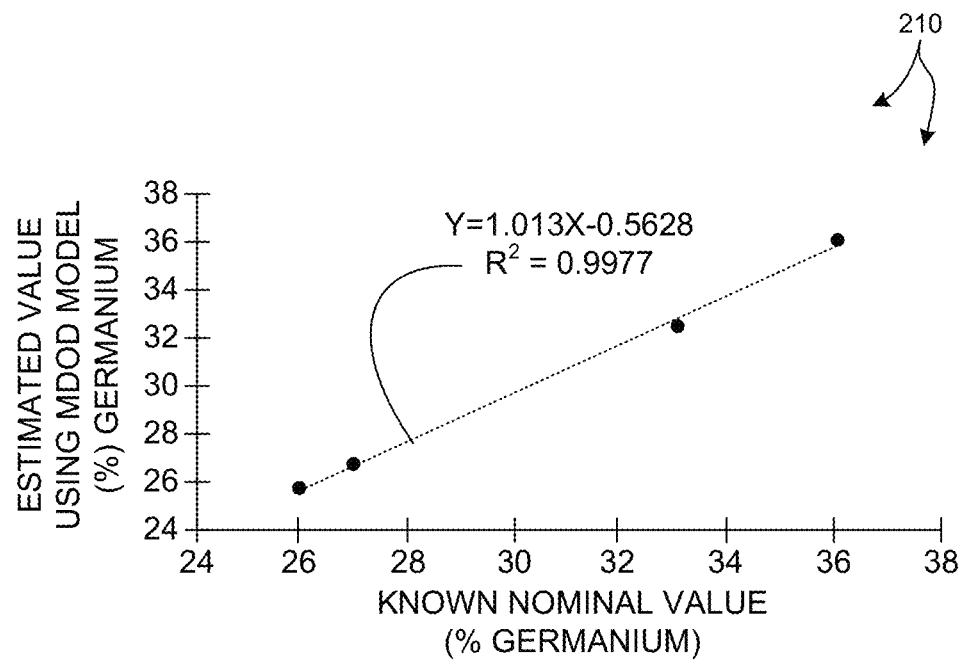
FIG. 4 is a plot 210 illustrative of known nominal values versus values of Germanium concentration estimated in accordance with a MDOD model at various locations on four different wafers.

FIG. 4 depicts a plot 210 indicating the known nominal values of Germanium concentration associated with four different wafers. In addition, plot 210 indicates the average estimated value of Germanium concentration as measured at many locations on the surface of each wafer in accordance with an MDOD model as described herein. As depicted in FIG. 4, the estimated values closely track the known, nominal values. The goodness of fit is characterized by the slope, y-intercept, and $R^2$ values illustrated in FIG. 4.

Figure 5:
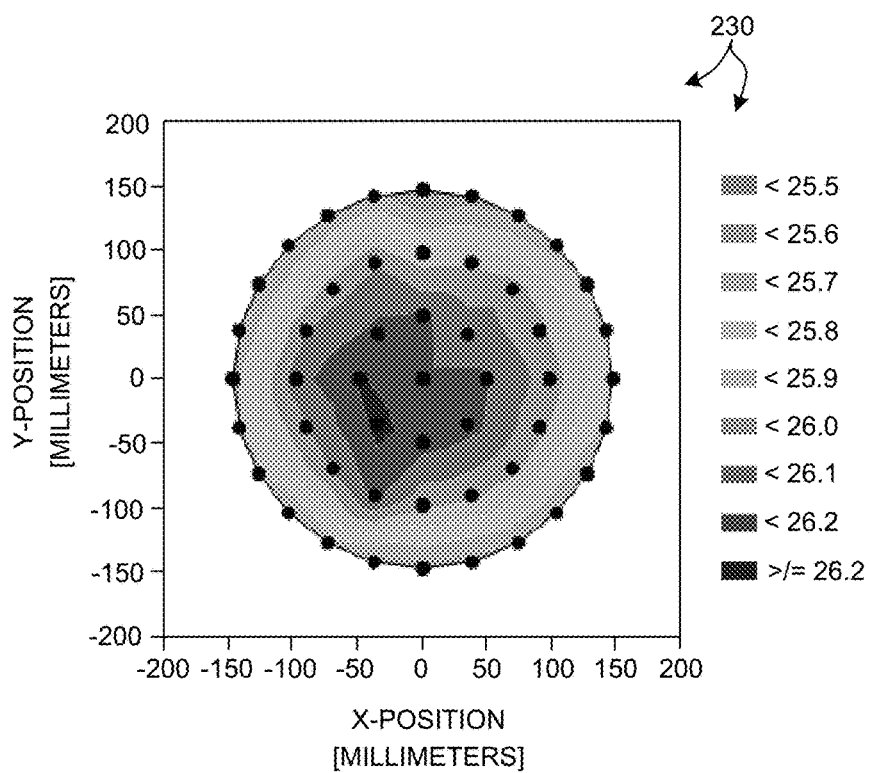
FIG. 5 depicts a contour plot 230 indicating a map of Germanium concentration of a first wafer measured in accordance with an MDOD model at various wafer locations.

FIG. 5 depicts a contour plot 230 indicating a map of Germanium concentration percentage measured in accordance with an MDOD model at wafer locations indicated with a dot. The known nominal value of film thickness of the measured wafer is 500 Angstroms and the known nominal value of Germanium concentration is 26%.

Figure 6:
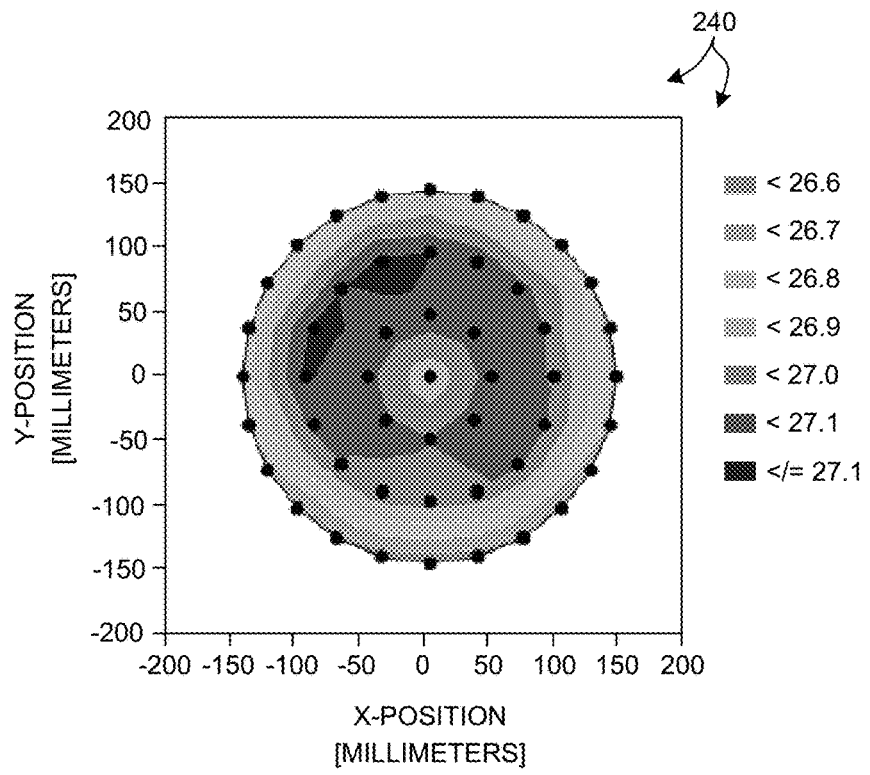
FIG. 6 depicts a contour plot 240 indicating a map of Germanium concentration of a second wafer measured in accordance with an MDOD model at various wafer locations.

FIG. 6 depicts a contour plot 240 indicating a map of Germanium concentration percentage measured in accordance with an MDOD model at wafer locations indicated with a dot. The known nominal value of film thickness of the measured wafer is 500 Angstroms and the known nominal value of Germanium concentration is 27%.

Figure 7:
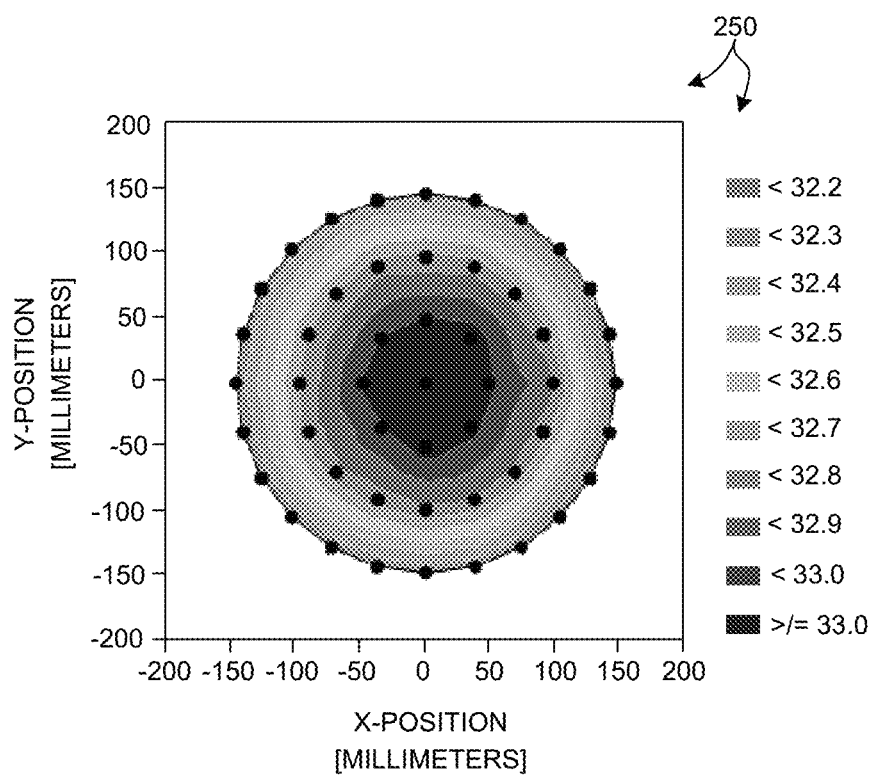
FIG. 7 depicts a contour plot 250 indicating a map of Germanium concentration of a third wafer measured in accordance with an MDOD model at various wafer locations.

FIG. 7 depicts a contour plot 250 indicating a map of Germanium concentration percentage measured in accordance with an MDOD model at wafer locations indicated with a dot. The known nominal value of film thickness of the measured wafer is 200 Angstroms and the known nominal value of Germanium concentration is 33%.

Figure 8:
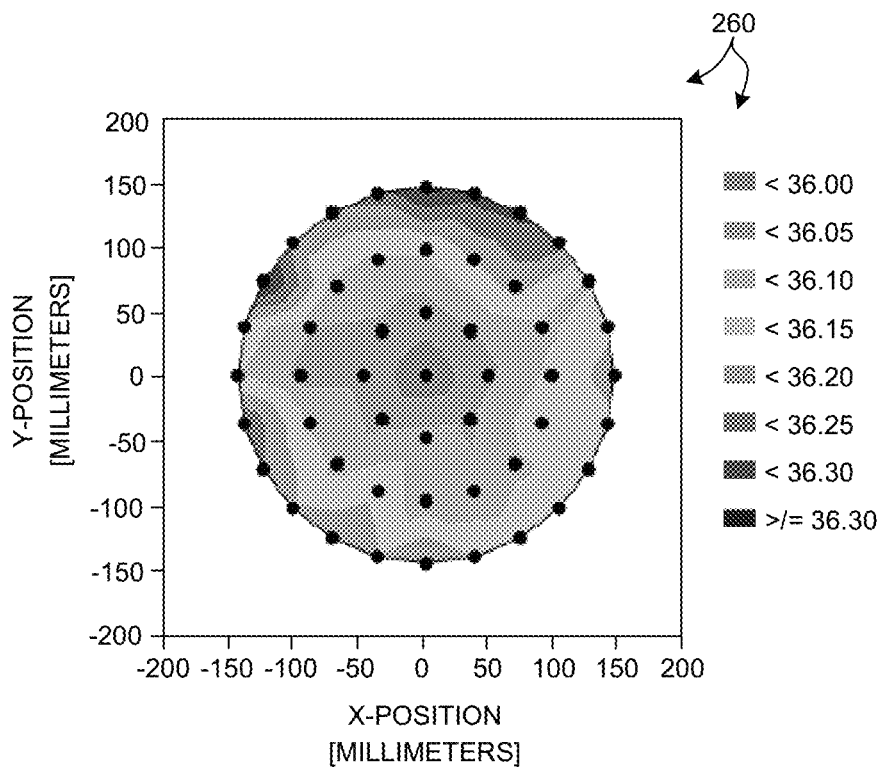
FIG. 8 depicts a contour plot 260 indicating a map of Germanium concentration of a fourth wafer measured in accordance with an MDOD model at various wafer locations.

FIG. 8 depicts a contour plot 260 indicating a map of Germanium concentration percentage measured in accordance with an MDOD model at wafer locations indicated with a dot. The known nominal value of film thickness of the measured wafer is 200 Angstroms and the known nominal value of Germanium concentration is 36%.

In one embodiment, the MDOD model described herein is implemented in the Film Thickness Measurement Library (FTML) of the Off-line Spectral Analysis (OLSA) stand-alone software designed to complement thin film measurement systems such as the Aleris 8510 available from KLA-Tencor Corporation, Milpitas, Calif. (USA). Measurements performed on test samples including alloy materials showed high precision and reliability at high throughput. Furthermore, extracted parameters show promise for monitoring and controlling film thickness and alloy concentration by way of non-limiting example.

In another further aspect, device performance is improved by controlling a process of manufacture of the semiconductor wafer based at least in part on the identified parameter values. In one example, film thickness may be controlled based on the measured film thickness identified from the MDOD model of film thickness illustrated in Equation (6).

Although, the MDOD model is described with reference to modeling of alloy structures, the model can be applied to other materials. In some examples, the model can be configured to describe materials of a variety of nanostructures (e.g., nanowires, quantum dots and quantum wells). The model can be generalized to include any number of defect levels. In another example, the model can be applied to nanostructures (e.g., quantum wells, quantum dots and nanowires) embedded in another amorphous dielectric slab or layer. In another example, the model can be applied to newly developed photoresists such as molecular resists or copolymers, high-K dielectrics such as HfO2, disordered materials, and uranium oxides (UOx).

In another further aspect, separate determinations of values of parameters associated with different layers of a wafer can be made based on the same spectral response data. For example, a wafer under measurement may include a semiconductor substrate 112, an intermediate layer 114B, a SiGe layer 114A, and an additional film layer (not shown). The spectral response data received from spectrometer 104 includes contributions from all of these layers. A stack layer model that captures the contributions of each of these layers can be used to separately determine parameter values associated with each different physical layer or group of physical layers under analysis.

In another further aspect, values of parameters of an MDOD model are used to grade wafers and microchips early in the production process based on the quality of the partially fabricated device. This may avoid the need to grade wafers and microchips at the end of the production process using expensive and time consuming electrical test equipment.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

One or more layers may be formed upon a wafer. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

A typical semiconductor process includes wafer processing by lot. As used herein a "lot" is a group of wafers (e.g., group of 25 wafers) which are processed together. Each wafer in the lot is comprised of many exposure fields from the lithography processing tools (e.g. steppers, scanners, etc.). Within each field may exist multiple die. A die is the functional unit which eventually becomes a single chip. One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Although embodiments are described herein with respect to wafers, it is to be understood that the embodiments may be used for characterizing thin films of another specimen such as a reticle, which may also be commonly referred to as a mask or a photomask. Many different types of reticles are known in the art, and the terms "reticle," "mask," and "photomask" as used herein are intended to encompass all types of reticles known in the art.

Although embodiments are described herein with respect to measurement of thin films applied to wafers, it is to be understood that the methods and systems disclosed herein may be used for characterizing critical dimensions of semiconductor structures, overlay among layers of semiconductor structures, and material composition of semiconductor structures.

The embodiments described herein generally relate to methods for determining characteristics of multi-layer thin films based on optical model parameter values at high throughput. For example, one embodiment relates to a computer-implemented method for determining material composition characteristics of multi-layer thin films based on optical model parameter values derived from spectroscopic ellipsometer data. However, in other examples, measurement of critical dimensions, overlay, and electrical properties using the techniques described herein is also contemplated. Similarly, the methods described herein are not limited in the types of metrology systems from which optical model parameter values may be derived. For example, in one embodiment, the metrology system includes a reflectometer for thin film inspection of the wafer. In general, the optical dispersion models described herein may be applied to the analysis of measurement data received from a variety of broadband and narrowband metrology tools. For example, spectroscopic ellipsometers and reflectometers, multi-angle ellipsometers and reflectometers, including any number or type of illumination sources (e.g., lamp or laser based sources emitting light in the visible, infra-red, ultra-violet, vacuum ultraviolet, deep ultraviolet spectrums) may be contemplated within the scope of this patent document.

In addition, the metrology system may be configured for inspection of patterned wafers and/or unpatterned wafers. The inspection system may be configured as a LED inspection tool, edge inspection tool, backside inspection tool, macro-inspection tool, or multi-mode inspection tool (involving data from one or more platforms simultaneously), and any other metrology or inspection tool that benefits from the determination of band structure characteristics of multi-layer thin films based on optical model parameter values at high throughput. Thus, the terms "metrology" system and "inspection" system may be used interchangeably.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
an illuminator configured to provide an amount of illumination to a semiconductor wafer across a spectral range at a measurement spot on the semiconductor wafer;
a spectrometer configured to collect an amount of light from the measurement spot in response to the illumination provided by the illuminator and generate an amount of data indicative of a spectral response of the semiconductor wafer at the measurement spot; and
one or more computing systems configured to:
  receive the spectral response of the semiconductor wafer across the spectral range;
  parameterize one or more parameters of a base optical dispersion model characterizing an optical response of one or more layers of the semiconductor wafer in terms of one or more parameters external to the base optical dispersion model;

estimate values of the one or more parameters of the base optical dispersion model based at least in part on the spectral response; and store the values of the one or more parameters of the base optical dispersion model in a memory.

2. The system of claim 1, wherein the computing system is further configured to:

estimate values of the one or more external parameters based at least in part on the spectral response.

3. The system of claim 1, wherein the computing system is further configured to:

estimate values of one or more parameters characterizing a layer of the semiconductor wafer based at least in part on values of the one or more parameters of the base optical dispersion model, wherein the layer of the semiconductor wafer is different from the one or more layers of the semiconductor wafer characterized by the base optical dispersion model.

4. The system of claim 1, wherein the one or more parameters of the base optical dispersion model are characterized in terms of the one or more parameters external to the base optical dispersion model by one or more power law functions.

5. The system of claim 1, wherein the one or more parameters of the base optical dispersion model are electrical parameters describing at least one of the one or more layers of the semiconductor wafer.

6. The system of claim 1, wherein the one or more external parameters includes a fabrication control parameter or a structural parameter characterizing a material or dimension of a structure of the semiconductor wafer.

7. The system of claim 6, wherein the fabrication control parameter includes any of a process temperature, a process pressure, and a process material flow, and wherein the structural characteristic of the semiconductor layer includes any of a film thickness, a material concentration of an alloy material, a process induced deformation, an impurity concentration, and a device dimension.

8. The system of claim 1, wherein at least one of the one or more external parameters is a fixed valued parameter, and wherein the estimating of the values of the one or more parameters of the base optical dispersion model is based at least in part on the fixed valued parameter.

9. The system of claim 8, wherein the fixed value is not determined by the spectral response of the semiconductor wafer at the measurement spot.

10. The system of claim 4, wherein the one or more computing systems are further configured to:

control a process of manufacture of the semiconductor wafer based at least in part on the value of the fabrication control parameter or structural parameter.

11. The system of claim 1, wherein a first layer of the semiconductor wafer is an alloy material layer disposed above a semiconductor substrate.

12. The system of claim 1, wherein the illuminator and spectrometer are configured as any of an ellipsometer and a reflectometer.

13. A method comprising:

receiving a spectral response at a measurement spot on a semiconductor wafer across a spectral range;

parameterizing one or more parameters of a base optical dispersion model characterizing an optical response of one or more layers of the semiconductor wafer in terms of one or more parameters external to the base optical dispersion model;

estimating values of the one or more parameters of the base optical dispersion model based at least in part on the spectral response; and storing the values of the one or more parameters of the base optical dispersion model in a memory.

14. The method of claim 13, further comprising:

estimating values of the one or more external parameters based at least in part on the spectral response.

15. The method of claim 13, further comprising:

estimating values of one or more parameters characterizing a layer of the semiconductor wafer based at least in part on values of the one or more parameters of the base optical dispersion model, wherein the layer of the semiconductor wafer is different from the one or more layers of the semiconductor wafer characterized by the base optical dispersion model.

16. The method of claim 13, wherein the one or more parameters of the base optical dispersion model are characterized in terms of the one or more parameters external to the base optical dispersion model by one or more power law functions.

17. The method of claim 13, wherein the one or more external parameters includes a fabrication control parameter or a structural parameter characterizing a material or dimension of a structure of the semiconductor wafer.

18. The method of claim 13, wherein at least one of the one or more external parameters is a fixed valued parameter, and wherein the estimating of the values of the one or more parameters of the base optical dispersion model is based at least in part on the fixed valued parameter.

19. A system comprising:

an illuminator configured to provide an amount of illumination to a semiconductor wafer across a spectral range at a measurement spot on the semiconductor wafer;

a spectrometer configured to collect an amount of light from the measurement spot in response to the illumination provided by the illuminator and generate an amount of data indicative of a spectral response of the semiconductor wafer at the measurement spot; and a non-transitory, computer-readable medium, comprising:

code for causing a computing system to receive the spectral response of the semiconductor wafer across the spectral range;

code for causing the computing system to parameterize one or more parameters of a base optical dispersion model characterizing an optical response of one or more layers of the semiconductor wafer in terms of one or more parameters external to the base optical dispersion model;

code for causing the computing system to estimate values of the one or more parameters of the base optical dispersion model based at least in part on the spectral response; and code for causing the computing system to store the values of the one or more parameters of the base optical dispersion model in a memory.

20. The system of claim 19, the non-transitory, computer-readable medium further comprising:

code for causing the computing system to estimate values of the one or more external parameters based at least in part on the spectral response.

* * * * *